(12) United States Patent
Aman et al.

(10) Patent No.: US 12,385,384 B2
(45) Date of Patent: Aug. 12, 2025

(54) RATE OF PENETRATION (ROP) OPTIMIZATION ADVISORY SYSTEM

(71) Applicant: SAUDI ARABIAN OIL COMPANY, Dhahran (SA)

(72) Inventors: Beshir M. Aman, Khobar (SA); Hermann F. Spoerker, Dhahran (SA); Mohammad S. Nefai, Dhahran (SA); Alexey Alexeyenko, Dhahran (SA); Bader M. Otaibi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 161 days.

(21) Appl. No.: 17/111,851

(22) Filed: Dec. 4, 2020

(65) Prior Publication Data

US 2022/0178240 A1    Jun. 9, 2022

(51) Int. Cl.
*E21B 45/00*      (2006.01)
*E21B 44/00*      (2006.01)
(Continued)

(52) U.S. Cl.
CPC .............. *E21B 45/00* (2013.01); *E21B 44/00* (2013.01); *E21B 44/02* (2013.01);
(Continued)

(58) Field of Classification Search
None
See application file for complete search history.

(56) References Cited

U.S. PATENT DOCUMENTS

| | | | | | |
|---|---|---|---|---|---|
| 5,415,030 | A | * | 5/1995 | Jogi | E21B 12/02 73/152.05 |
| 6,155,357 | A | * | 12/2000 | King | E21B 44/00 702/9 |

(Continued)

FOREIGN PATENT DOCUMENTS

| | | | | |
|---|---|---|---|---|
| CA | 2734642 C | | 3/2018 | |
| CA | 3014816 A1 | * | 10/2018 | ............. E21B 19/06 |

(Continued)

OTHER PUBLICATIONS

Hegde, Chiranth; Daigle, Hugh; and Gray, Ken E.—"Performance Comparison of Algorithms for Real-Time Rate-of-Penetration Optimization in Drilling Using Data-Driven Models"; Oct. 2018 SPE Journal. (Year: 2018).*

(Continued)

*Primary Examiner* — Arleen M Vazquez
*Assistant Examiner* — Leonard S Liang
(74) *Attorney, Agent, or Firm* — Osha Bergman Watanabe & Burton LLP

(57) ABSTRACT

A method for performing a drilling operation of a well in a subterranean formation is disclosed. The method includes obtaining drilling data records each including a revolutions per minute (RPM) value, a weight on bit parameter (WOB) value, and a rate of penetration (ROP) value, analyzing, using a computer processor, the drilling data records to generate a maximum point including a maximum ROP value that is based on a predetermined percentile of an ROP distribution of the drilling data records, generating, using the computer processor and based on the maximum point and a current point, a recommendation point including a recommended RPM value and a recommended WOB value, where the current point includes a current RPM value, a current WOB value, and a current ROP value of the drilling opera- (Continued)

tion, and presenting, to a user, the recommendation point to facilitate the drilling operation.

18 Claims, 10 Drawing Sheets

(51) Int. Cl.
*E21B 44/02* (2006.01)
*G06Q 10/0639* (2023.01)
*E21B 21/08* (2006.01)
*E21B 41/00* (2006.01)
*E21B 44/04* (2006.01)

(52) U.S. Cl.
CPC .......... *G06Q 10/0639* (2013.01); *E21B 21/08* (2013.01); *E21B 41/00* (2013.01); *E21B 44/04* (2013.01)

(56) References Cited

U.S. PATENT DOCUMENTS

| | | | |
|---|---|---|---|
| 6,192,998 B1* | 2/2001 | Pinckard | E21B 44/00 175/57 |
| 9,482,084 B2 | 11/2016 | Chang et al. | |
| 9,598,947 B2 | 3/2017 | Wang et al. | |
| 10,221,671 B1* | 3/2019 | Zhang | G06N 3/084 |
| 10,533,409 B2* | 1/2020 | Benson | E21B 44/04 |
| 2011/0220410 A1* | 9/2011 | Aldred | E21B 7/04 175/26 |
| 2012/0123757 A1* | 5/2012 | Ertas | E21B 45/00 703/2 |
| 2013/0105221 A1* | 5/2013 | Wassell | E21B 44/04 175/40 |
| 2013/0127900 A1 | 5/2013 | Pena et al. | |
| 2013/0245950 A1* | 9/2013 | Jain | E21B 10/00 702/9 |
| 2013/0255939 A1* | 10/2013 | Kumaran | E21B 41/00 166/53 |
| 2015/0227841 A1 | 8/2015 | Laing et al. | |
| 2016/0258764 A1* | 9/2016 | Phuyal | G09B 29/10 |
| 2018/0245446 A1 | 8/2018 | Astrid et al. | |
| 2018/0283157 A1* | 10/2018 | Hadi | E21B 47/06 |
| 2019/0032467 A1 | 1/2019 | Wang et al. | |
| 2019/0048704 A1* | 2/2019 | Kumaran | E21B 44/02 |
| 2019/0048706 A1* | 2/2019 | Benson | E21B 7/24 |
| 2019/0048707 A1* | 2/2019 | Benson | E21B 7/068 |
| 2019/0316457 A1* | 10/2019 | Al-Rubaii | E21B 44/06 |
| 2020/0056470 A1* | 2/2020 | Ng | E21B 3/022 |
| 2020/0063546 A1* | 2/2020 | Weideman | E21B 7/061 |

FOREIGN PATENT DOCUMENTS

| | | |
|---|---|---|
| WO | 2011016927 A1 | 2/2011 |
| WO | 2016160005 A1 | 10/2016 |
| WO | 2018029454 A1 | 2/2018 |
| WO | 2021242287 A1 | 12/2021 |

OTHER PUBLICATIONS

Jun. 3, 2020 Blog Entry—"Drill the Best Well Possible While Reducing Costs with Corva"; https://www.corva.ai/blog/drill-the-best-well-possible-while-reducing-costs-with-corva (Year: 2020).*
Screenshot of Corva blog, proving Jun. 3, 2020 date of the "Drill the Best Well Possible . . . " entry (Year: 2020).*
Bataee, M. and M. Mohseni, "Application of Artificial Intelligent Systems in ROP Optimization: a Case Study in Shadegan Oil Field", SPE 140029, Society of Petroleum Engineers, Jan.-Feb. 2011, pp. 1-10 (10 pages).
Omar, M. et al., "Hybrid System Maximizes ROP and Minimizes Drilling Cost in Large Diameter Directional Application", SPE-184142-MS, Society of Petroleum Engineers, Dec. 2016, pp. 1-9 (9 pages).
Dupriest, F.E., "Comprehensive Drill-Rate Management Process to Maximize Rate of Penetration", SPE 102210, Society of Petroleum Engineers, Sep. 2006, pp. 1-9 (9 pages).
International Search Report and Written Opinion issued in Application No. PCT/US2021/061766, mailed on Mar. 31, 2022 (13 pages).
"Optimize Batch Drilling Efficiency", Apr. 1, 2020; pp. 1-5; XP055903803; Retrieved from the Internet: Jun. 30, 2022; URL: https://blog.corva.ai/batch-drilling-efficiency-dashboard (5 pages).
"Drill Faster Using ROP and MSE Heatmaps", Oct. 17, 2017; pp. 1-5; XP055903110; Retrieved from the Internet: Mar. 18, 2022; URL: https;//blog.corva.ai/drill-faster-using-rop-and-mse-heatmaps (5 pages).
Office Action issued by the Saudi Arabian patent office for corresponding Saudi Arabian patent application No. 523441020, mailed Mar. 20, 2025 (13 pages).

* cited by examiner

RATE OF PENETRATION (ROP) OPTIMIZATION ADVISORY SYSTEM

BACKGROUND

In the drilling industry, the rate of penetration (ROP) is the speed at which a drill bit breaks the rock under it to deepen the borehole. Weight on bit (WOB) is the amount of downward force exerted on the drill bit and is normally measured in thousands of pounds. Weight on bit is provided by gravity acting on the large mass of the drill collars to provide the downward force needed for the bit to efficiently break the underlying rocks. Drill-Off Test (DOT) procedure is a manual time consuming process where the driller physically tests many predefined RPM (revolutions per minute) and WOB combinations in drilling and observes corresponding ROP values to select a combination that results in the highest ROP.

SUMMARY

In general, in one aspect, the invention related to a method for performing a drilling operation of a well in a subterranean formation. The method includes obtaining a plurality of drilling data records each comprising a revolutions per minute (RPM) value, a weight on bit parameter (WOB) value, and a rate of penetration (ROP) value, analyzing, using a computer processor, the plurality of drilling data records to generate a maximum point comprising a maximum ROP value that is based on a predetermined percentile of an ROP distribution of the plurality of drilling data records, generating, using the computer processor and based on the maximum point and a current point, a recommendation point comprising a recommended RPM value and a recommended WOB value, wherein the current point comprises a current RPM value, a current WOB value, and a current ROP value of the drilling operation, and presenting, to a user, the recommendation point to facilitate the drilling operation.

In general, in one aspect, the invention related to a computer system for performing a drilling operation of a well in a subterranean formation, The computer system includes a processor and a memory coupled to the processor and storing instruction. The instructions, when executed by the processor, include functionality for obtaining a plurality of drilling data records each comprising a revolutions per minute (RPM) value, a weight on bit parameter (WOB) value, and a rate of penetration (ROP) value, analyzing the plurality of drilling data records to generate a maximum point comprising a maximum ROP value that is based on a predetermined percentile of an ROP distribution of the plurality of drilling data records, generating, based on the maximum point and a current point, a recommendation point comprising of a recommended RPM value and a recommended WOB value, wherein the current point comprises a current RPM value, a current WOB value, and a current ROP value of the drilling operation, and presenting, to a user, the recommendation point to facilitate the drilling operation.

Other aspects and advantages will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments of this disclosure provide a method, system, and non-transistory computer medium to maximize the rate of penetration (ROP) for a drilling operation by analyzing real time downhole data and data of offset wells to generate recommendations of optimal parameter combinations in real-time. In one or more embodiments of the invention, the recommended optimal parameter combination includes revolutions per minute (RPM) and weight on bit (WOB) and is provided to the rig foremen (i.e., driller) and drilling engineer.

Figure 1:
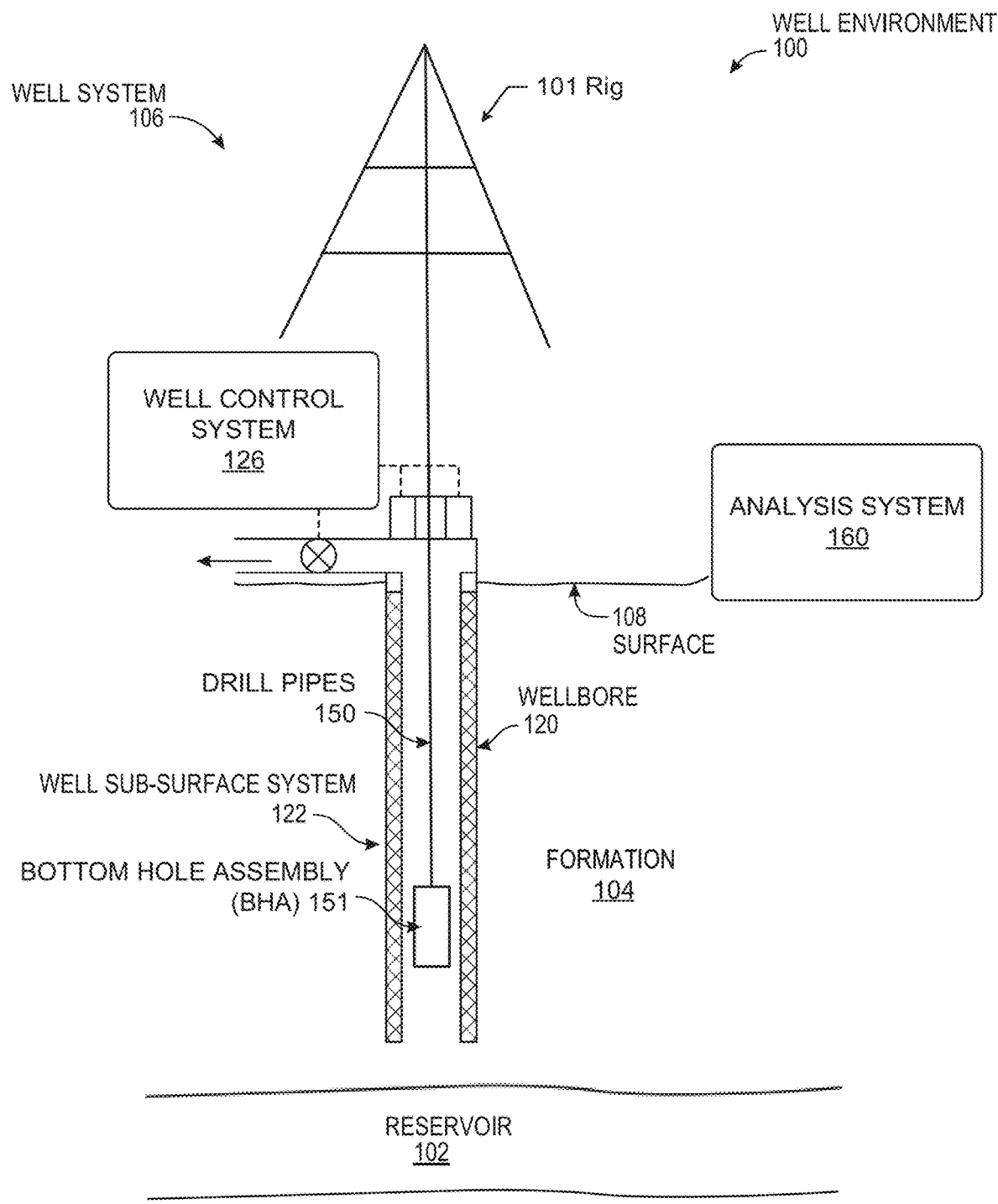
FIGS. 1 and 2 show systems in accordance with one or more embodiments.

FIG. 1 shows a schematic diagram in accordance with one or more embodiments. As shown in FIG. 1, a well environment (100) includes a subterranean formation ("formation") (104) and a well system (106). The formation (104) may include a porous or fractured rock formation that resides underground, beneath the earth's surface ("surface") (108). The formation (104) may include different layers of rock having varying characteristics, such as varying degrees of permeability, porosity, capillary pressure, and resistivity. In the case of the well system (106) being a hydrocarbon well, the formation (104) may include a hydrocarbon-bearing reservoir (102). In the case of the well system (106) being operated as a production well, the well system (106) may facilitate the extraction of hydrocarbons (or "production") from the reservoir (102).

In some embodiments disclosed herein, the well system (106) includes a rig (101), a wellbore (120), a well subsurface system (122), an analysis system (160), and a well control system ("control system") (126). In the context of the drilling operation, the wellbore (120) is referred to as the target well. The well control system (126) may control various operations of the well system (106), such as well production operations, well drilling operation, well completion operations, well maintenance operations, and reservoir monitoring, assessment and development operations. In some embodiments, the well control system (126) includes a computer system.

The rig (101) is the machine used to drill a borehole to form the wellbore (120). Major components of the rig (101) include the drilling fluid tanks, the drilling fluid pumps (e.g., rig mixing pumps), the derrick or mast, the draw works, the rotary table or top drive, the drill string, the power generation equipment and auxiliary equipment. Drilling fluid, also referred to as "drilling mud" or simply "mud," is used to facilitate drilling boreholes into the earth, such as drilling oil and natural gas wells. The main functions of drilling fluids include providing hydrostatic pressure to prevent formation fluids from entering into the borehole, keeping the drill bit cool and clean during drilling, carrying out drill cuttings, and suspending the drill cuttings while drilling is paused and when the drilling assembly is brought in and out of the borehole.

The wellbore (120) includes a bored hole (i.e., borehole) that extends from the surface (108) towards a target zone of the formation (104), such as the reservoir (102). An upper end of the wellbore (120), terminating at or near the surface (108), may be referred to as the "up-hole" end of the wellbore (120), and a lower end of the wellbore, terminating in the formation (104), may be referred to as the "downhole" end of the wellbore (120). The wellbore (120) may facilitate the circulation of drilling fluids during drilling operations for the wellbore (120) to extend towards the target zone of the formation (104) (e.g., the reservoir (102)), facilitate the flow of hydrocarbon production (e.g., oil and gas) from the reservoir (102) to the surface (108) during production operations, facilitate the injection of substances (e.g., water) into the hydrocarbon-bearing formation (104) or the reservoir (102) during injection operations, or facilitate the communication of monitoring devices (e.g., logging tools) lowered into the formation (104) or the reservoir (102) during monitoring operations (e.g., during in situ logging operations).

In some embodiments, the well system (106) is provided with a bottom hole assembly (BHA) (151) attached to drill pipes (150) to suspend into the wellbore (120) for performing the well drilling operation. The bottom hole assembly (BHA) is the lowest part of a drill string and includes the drill bit, drill collar, stabilizer, mud motor, etc. A mud motor is a drilling motor that uses hydraulic horsepower of the drilling fluid to drive the drill bit during the drilling operation.

In some embodiments, the analysis system (160) includes hardware and/or software with functionality for facilitating operations of the well system (106), such as well production operations, well drilling operation, well completion operations, well maintenance operations, and reservoir monitoring, assessment and development operations. For example, the analysis system (160) may store drilling data records of drilling the wellbore (120) and associated offset wells (not shown). The analysis system (160) may analyze the drilling data records to generate recommendations to facilitate drilling the wellbore (120) with an optimized rate of penetration (ROP). In this context, the analysis system (160) is referred to as an ROP optimization advisory system. While the analysis system (160) is shown at a well site, embodiments are contemplated where the analysis system (160) is located away from well sites. In some embodiments, the analysis system (160) may include a computer system that is similar to the computer system (500) described below with regard to FIGS. 5A and 5B and the accompanying description.

Figure 2:
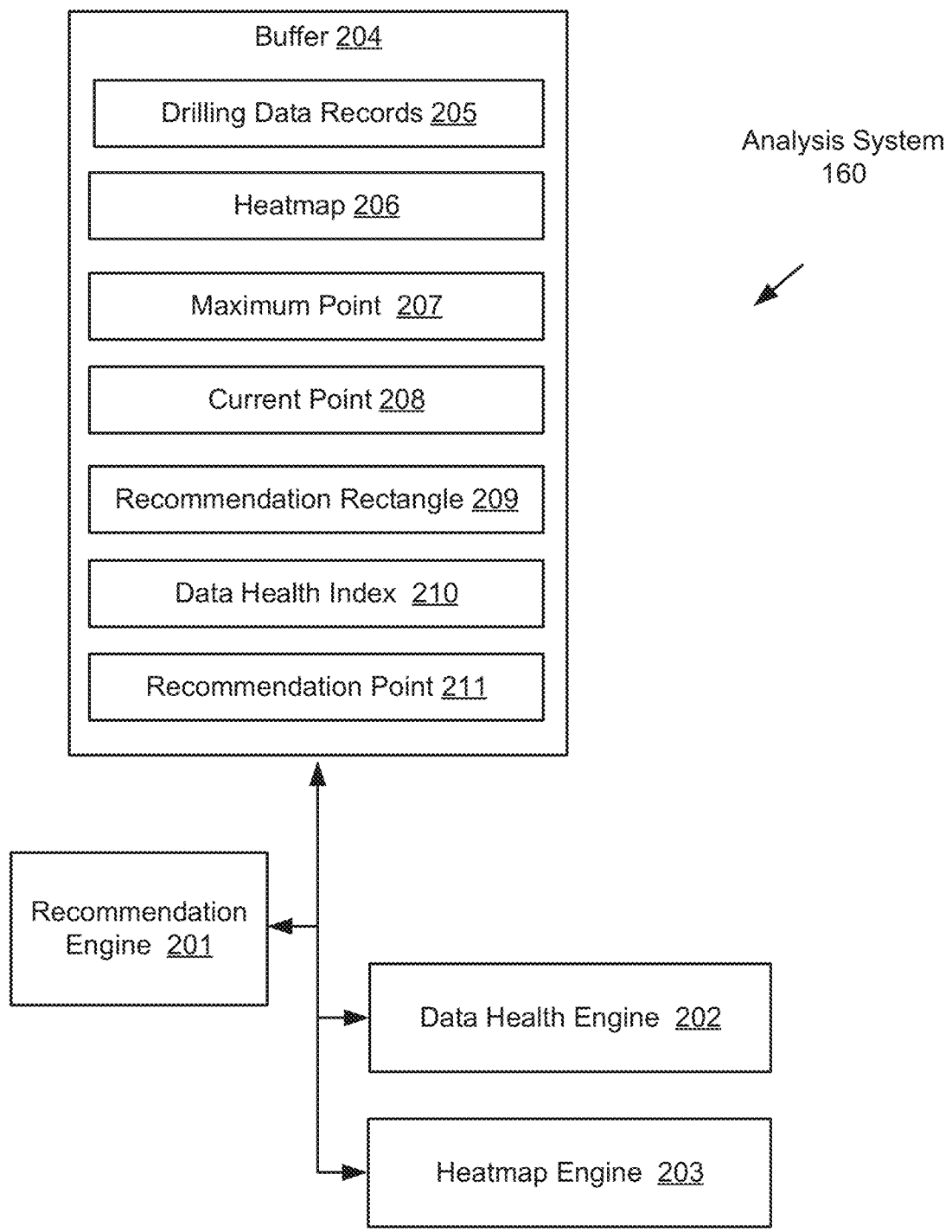

Turning to FIG. 2, FIG. 2 illustrates details of the analysis system (160) in accordance with one or more embodiments disclosed herein. In one or more embodiments, one or more of the modules and/or elements shown in FIG. 2 may be omitted, repeated, combined and/or substituted. Accordingly, embodiments disclosed herein should not be considered limited to the specific arrangements of modules and/or elements shown in FIG. 2.

As shown in FIG. 2, FIG. 2 illustrates the analysis system (160) that has multiple components, including, for example, a buffer (204), a recommendation engine (201), a heatmap engine (202), and a data health engine (203). Each of these components (201, 202, 203, 204) may be located on the same computing device (e.g., personal computer (PC), laptop, tablet PC, smart phone, multifunction printer, kiosk, server, etc.) or on different computing devices that are connected via a network, such as a wide area network or a portion of Internet of any size having wired and/or wireless segments. Each of these components is discussed below.

In one or more embodiments of the invention, the buffer (204) may be implemented in hardware (i.e., circuitry), software, or any combination thereof. The buffer (204) is configured to store data generated and/or used by the analysis system (160). The data stored in the buffer (204) includes drilling data records (205), a heatmap (206), a maximum point (207), a current point (208), a recommendation rectangle (209), a data health index (210), and a recommendation point (211).

The drilling data records (205) are drilling parameters collected during the drilling operation of the wellbore (120) (i.e., the target well). The drilling parameters include revolutions per minute (RPM), weight on bit (WOB), and rate of penetration (ROP) of drilling the wellbore (120). The drilling parameters may also include one or more of hole depth, bit parameter, drilling fluid parameter, formation parameter, hole section data, etc. In one or more embodiments, the drilling operation is divided into a sequence of moving time windows where each drilling data record is collected during a moving time window of the sequence. The drilling data records (205) are continuously updated to include new drilling data records as the drilling operation progresses and the sequence of moving time windows extends itself. The drilling data records (205) may also include drilling parameters collected from offset wells of the wellbore (120). The offset well is an existing wellbore close to the wellbore (120) that provides information for planning the drilling operations of the wellbore (120).

A heatmap is a graphical representation of data where values are depicted by color or shading/pattern. Heatmaps allow a user to visualize and understand complex data at a glance. The heatmap (206) is a graphical representation of the ROP parameter with respect to other parameters of the drilling data records (205). The drilling parameters, with the exception of the ROP parameter, form a multi-dimensional drilling parameter space where each drilling data record of the drilling data records (205) corresponds to a point in the drilling parameter space. The heatmap (206) represents the ROP value of each drilling data record by assigning a representative color or shading/pattern to the corresponding point in the multi-dimensional drilling parameter space. The ROP values of the drilling data records (205) form a ROP value distribution that can be visualized based on the color or shading/pattern of the heatmap (206). An example of the heatmap (206) is described in reference to FIG. 4B below.

The maximum point (207) is a point in the heatmap (206) where the ROP value is at or near the maximum of the ROP value distribution. A percentile of the drilling data records (205) is each of the 100 equal groups into which the ROP value distribution of the drilling data records (205) is divided. In one or more embodiments, the maximum point (207) has the ROP value in the 95th percentile of the ROP value distribution. An example of the maximum point (207) is described in reference to FIG. 4B below.

The current point (208) is a point in the heatmap (206) where the drilling parameters are used for or associated with the current moving time window of the drilling operation. An example of the current point (208) is described in reference to FIG. 4B below.

The recommendation rectangle (208) is a region in the multi-dimensional drilling parameter space where the drilling parameters (e.g., RPM, WOB, and one or more of hole depth, bit parameter, drilling fluid parameter, formation parameter, hole section data, etc.), with the exception of the ROP parameter, are within a predetermined range of the current point. In particular, each corner point of the recommendation rectangle (208) defines the maximum or minimum of the predetermined range for each drilling parameter. For example, the predetermined range for each drilling parameter may correspond to ±10% of the drilling parameter value of the current point. An example of the recommendation rectangle (208) is described in reference to FIGS. 4H-4K below.

The data health index (210) is a measure of how wide spread the drilling data records (205) are within the recommendation rectangle (208). In one or more embodiments, the data health index (210) is based on, for each drilling parameter, a ratio of the value range across the drilling data records (205) over the predetermined range of the recommendation rectangle (208). An example of the data health index (210) is described in reference to FIGS. 4C-4D below.

The recommendation point (211) is a set of recommended driller controllable drilling parameter values, with the exception of the ROP value, that is generated based on the maximum point (207), the current point (208), the recommendation rectangle (209), and the data health index (210). In one or more embodiments, the recommendation point (211) is presented to a user either at a drill site or at a back office location (e.g., a driller or a drilling engineer) to facilitate the drilling operation during the next moving time window subsequent to the current moving time window. An example of the recommendation point (211) is described in reference to FIGS. 4H-4K below.

In one or more embodiments of the invention, each of the recommendation engine (201), data health engine (202), and heatmap engine (203) may be implemented in hardware (i.e., circuitry), software, or any combination thereof.

In one or more embodiments of the invention, the recommendation engine (201) is configured to generate the recommendation point (211) from the drilling data records (205). In one or more embodiments, the recommendation engine (201) generates the recommendation point (211) based at least on generating the maximum point (207), the current point (208), and the recommendation rectangle (209) as intermediate results.

In one or more embodiments of the invention, the data health engine (202) is configured to generate the data health index (210) from the drilling data records (205) and the recommendation rectangle (209). In one or more embodiments, data health engine (202) provides the data health index (210) to the recommendation engine (201) for generating the recommendation point (211).

In one or more embodiments of the invention, the heatmap engine (203) is configured to generate the heatmap (206) from the drilling data records (205).

In one or more embodiments of the invention, the recommendation point (211), the data health index (210), and the heatmap (206) are presented to the user. For example, the recommendation point (211), the data health index (210), and the heatmap (206) may be presented via a graphical user interface. In another example, one or more of the recommendation point (211), the data health index (210), and the heatmap (206) may be presented via an audio message.

The analysis system (160) initially uses offset well data to generate (e.g., as an educated guess) an initial recommendation of RPM value and WOB value combination that potentially produces high ROP for the drilling operation. After starting drilling operation based on the initial recommendation, the analysis system (160) applies an adaptive Drill-Off Test (DOT) procedure to generate real-time recommendations for each of a continuous sequence of moving time windows. In order to avoid adverse side effects associated with high ROP levels such as hole cleaning, vibration or bit wearing issues, separate models are developed to predict each adverse side effect to aid in defining the corresponding predetermined range of the recommendation rectangle. The analysis system (160) alternates between two objectives throughout the drilling operation. The primary objective is to guide the drilling towards maximum ROP. The secondary objective is applied whenever drilling parameter variability (i.e., data health index) is low and currently drilling at maximum known ROP, in which case the analysis system (160) recommends to explore new drilling parameter ranges in a new Drill Off Test.

In one or more embodiments, the analysis system (160) performs the functionalities described above using the method described in reference to FIG. 3 below. Although the analysis system (160) is shown as having three engines (201, 202, 203), in other embodiments of the invention, the analysis system (160) may have more or fewer engines and/or more or fewer other components. Further, the functionality of each component described above may be split across components. Further still, each component (201, 202, 203) may be utilized multiple times to carry out an iterative operation.

Figure 3:
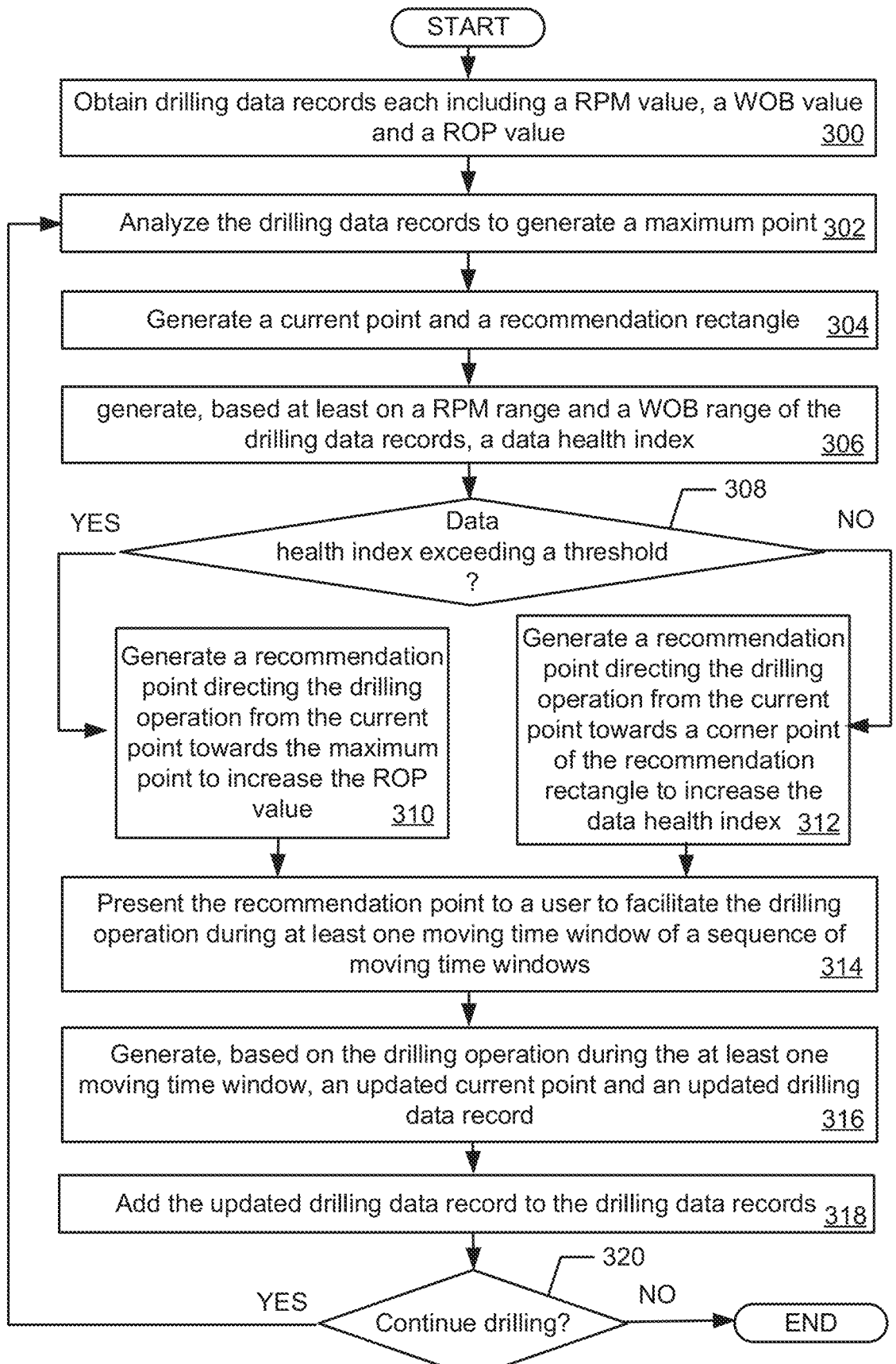
FIG. 3 shows a flowchart in accordance with one or more embodiments.

Turning to FIG. 3, FIG. 3 shows a flowchart in accordance with one or more embodiments. One or more blocks in FIG. 3 may be performed using one or more components as described in FIGS. 1 and 2. While the various blocks in FIG. 3 are presented and described sequentially, one of ordinary skill in the art will appreciate that some or all of the blocks may be executed in a different order, may be combined or omitted, and some or all of the blocks may be executed in parallel and/or iteratively. Furthermore, the blocks may be performed actively or passively.

Initially in Block 300, a set of drilling data records is obtained. Each drilling data record includes a RPM value, a WOB value, and a ROP value. Each drilling data record may also include one or more of a hole depth, a bit parameter, a drilling fluid parameter, a formation parameter, hole section data, etc. In one or more embodiments, each drilling data record is collected from a target well during a moving time window of a sequence of moving time windows spanning the duration of drilling the target well. The set of drilling data records may also include drilling parameters collected from offset wells of the target well. For example, an initial set of drilling data records may be obtained prior to the drilling operation based on historical data of at least one offset well. In one or more embodiments, the drilling operation is, or includes, an adaptive DOT procedure where an initial recommendation point for the adaptive DOT procedure is generated based on the initial set of drilling data records from the offset well(s).

In Block 302, the set of drilling data records is analyzed using a computer processor to generate a maximum point that includes a maximum ROP value based on a predetermined percentile of an ROP distribution of the set of drilling data records. In one or more embodiments, the ROP distribution is generated by ordering the set of drilling data records according to the ROP values. Accordingly, the ROP value corresponding to the predetermined percentile (e.g., $95^{th}$ percentile) is identified as the maximum ROP value.

In Block 304, a current point and a recommendation rectangle are generated. In one or more embodiments, the current point includes drilling parameters collected during a current moving time window of the sequence of moving time windows. In one or more embodiments, the recommendation rectangle centers at the current point and covers a range of each drilling parameter according to a predetermined percentage (e.g., 10%, 20%, etc.) of the drilling parameter values of the current point.

In Block 306, a data health index is generated based at least on a RPM range and a WOB range of the set of drilling data records. In one or more embodiments, the data health index is generated based on computing a ratio of the RPM range WOB range of the set of drilling data records over the corresponding ranges of the recommendation rectangle.

In Block 308, a determination is made as to whether the data health index exceeds a predetermined threshold. If the determination is positive, i.e., the data health index exceeds the predetermined threshold, the method proceeds to Block 310. If the determination is negative i.e., the data health index does not exceed the predetermined threshold, the method proceeds to Block 312.

In Block 310, the recommendation point is generated that directs the drilling operation from the current point towards the maximum point to increase the ROP value. In one or more embodiments, the recommendation point is set as the same as the maximum point if the maximum point, or a range (e.g., a ellipisoid shape) surrounding the maximum point, is within the recommendation rectangle. Alternatively if the maximum point, or a range (e.g., a ellipsoid shape) surrounding the maximum point, is not within the recommendation rectangle, the recommendation point is set as the intersection between the recommendation rectangle and a shortest path line from the current point to the maximum point.

In Block 312, the recommendation point is generated that directs the drilling operation from the current point to increase the data health index. In one or more embodiments, the recommendation point is set as a corner point of the recommendation rectangle. For example, the corner point furthest away from the set of drilling data records in the multi-dimensional drilling parameter space is selected as the recommendation point.

In Block 314, the recommendation point is presented to a user (e.g., a driller or a drilling engineer) to facilitate the drilling operation in at least one moving time window (i.e., a new moving time window) subsequent to the current moving time window. In one or more embodiments, an ROP heatmap with respect to the RPM value and the WOB value is generated based on the set of drilling data records and presented to the user to further facilitate the drilling operation in the new moving time window.

In Block 316, an updated current point and an updated drilling data record are generated based on the drilling operation during the new moving time window. In Block 318, the updated drilling data record is added to the set of drilling data records.

In Block 320, a determination is made as to whether the drilling operation is to continue. If the determination is positive, i.e., the drilling operation is to continue, the method returns to Block 302. If the determination is negative i.e., the drilling operation is not to continue, the method ends.

FIGS. 4A-4K show examples in accordance with one or more embodiments. The examples shown in FIGS. 4A-4K are based on the system and method described in reference to FIGS. 1-3 above. In particular, the examples shown in FIGS. 4A-4K relate to an ROP optimization advisory system which receives drilling real-time data and/or operation data as inputs to generate a set of operational recommendations for improving the drilling operation safely and timely. The system can be used by two types of users based on their location and function. At the rig-site, the system is used by the driller and rig foreman who act on the recommendations. At the back office, the system is used by drilling engineers, real-time operation center (RTOC), management, data scientists, etc. who monitor the recommendations with respect to quality and operation performance of the drilling operation in addition to offset wells analysis.

The input data used by the ROP optimization advisory system to generate recommendations includes drilling real-time surface parameters for the actual well and offset wells, such as hole depth, bit depth, RPM, WOB, ROP, flow-in-rate, etc. In addition, the well data of offset wells includes respective hole depths, formation parameters, and hole section data. The output of the ROP optimization advisory system includes real-time recommendations for RPM and WOB values, data health index, real-time heatmap profile of ROP, and offset wells comparison analysis. The ROP optimization advisory system facilitates conducting an adaptive DOT procedure where the driller implements the recommended set of RPM and WOB. An example of the driller's monitoring dashboard (400) is shown in FIG. 4A where the ROP optimization advisory system directs the driller to the optimal combination with directional arrows and data health index.

Figure 4A:
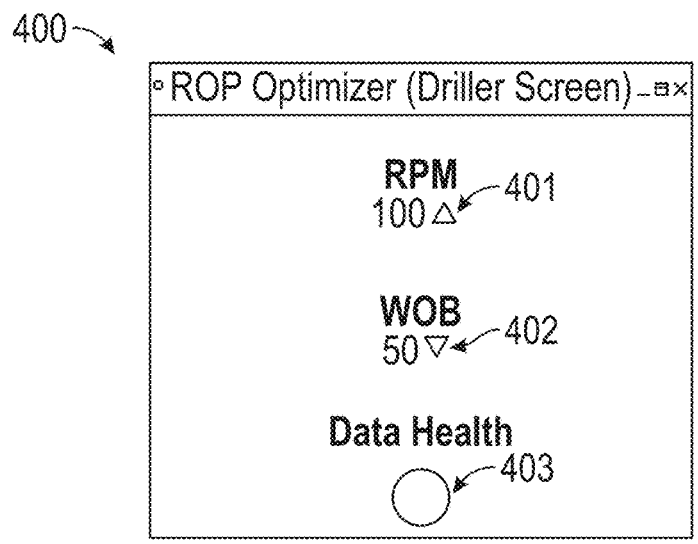
FIGS. 4A-4K show examples in accordance with one or more embodiments.

As shown in FIG. 4A, the recommendation window (400) is a user interface window where the directional arrow (401) directs the driller to increase the RPM parameter toward the value of 100 RPM. Similarly, the directional arrow (402) directs the driller to decrease the WOB parameter toward the value of 50 kilo-pounds. In addition, the data health index (403) represents a measure of data health based on the color or shading/pattern.

In the example shown in FIG. 4A, as a safety factor to allow time to clean the hole properly; i.e. remove generated drilling cuttings in a timely manner, the recommendations from the ROP optimization advisory system do not exceed 10% of the current RPM value and WOB value at any given time. In addition, the ROP optimization advisory system does not recommend RPM value and WOB value beyond machine capability as defined by the drilling equipment manufacturer. The driller has the option not to apply the system recommended RPM value and WOB value if more critical operational tasks are pending other than maximizing the ROP. Such critical tasks include but are not limited to well integrity issues, maintaining azimuth while building an angle, etc.

Once drilling operation is started, a moving time window (e.g., one-hour) is constructed within the ROP optimization advisory system. Within the time window, the current point is a combination of drilling parameter values (i.e., RPM, WOB, ROP, . . . etc.) that corresponds to a point within a multi-dimensional space defined by the corresponding drilling parameters, the maximum point is the maximum 95th percentile ROP point achieved within the given time window excluding any outlier ROP values, the recommendation rectangle is a rectangle in the multi-dimensional space and surrounds the current point where each point inside the recommendation rectangle is within a safety threshold (e.g., 10%) of the drilling parameter values of the current point, and the recommendation point is a point that leads from the current point to the maximum point without exceeding the boundary of the recommendation rectangle.

Figure 4B:
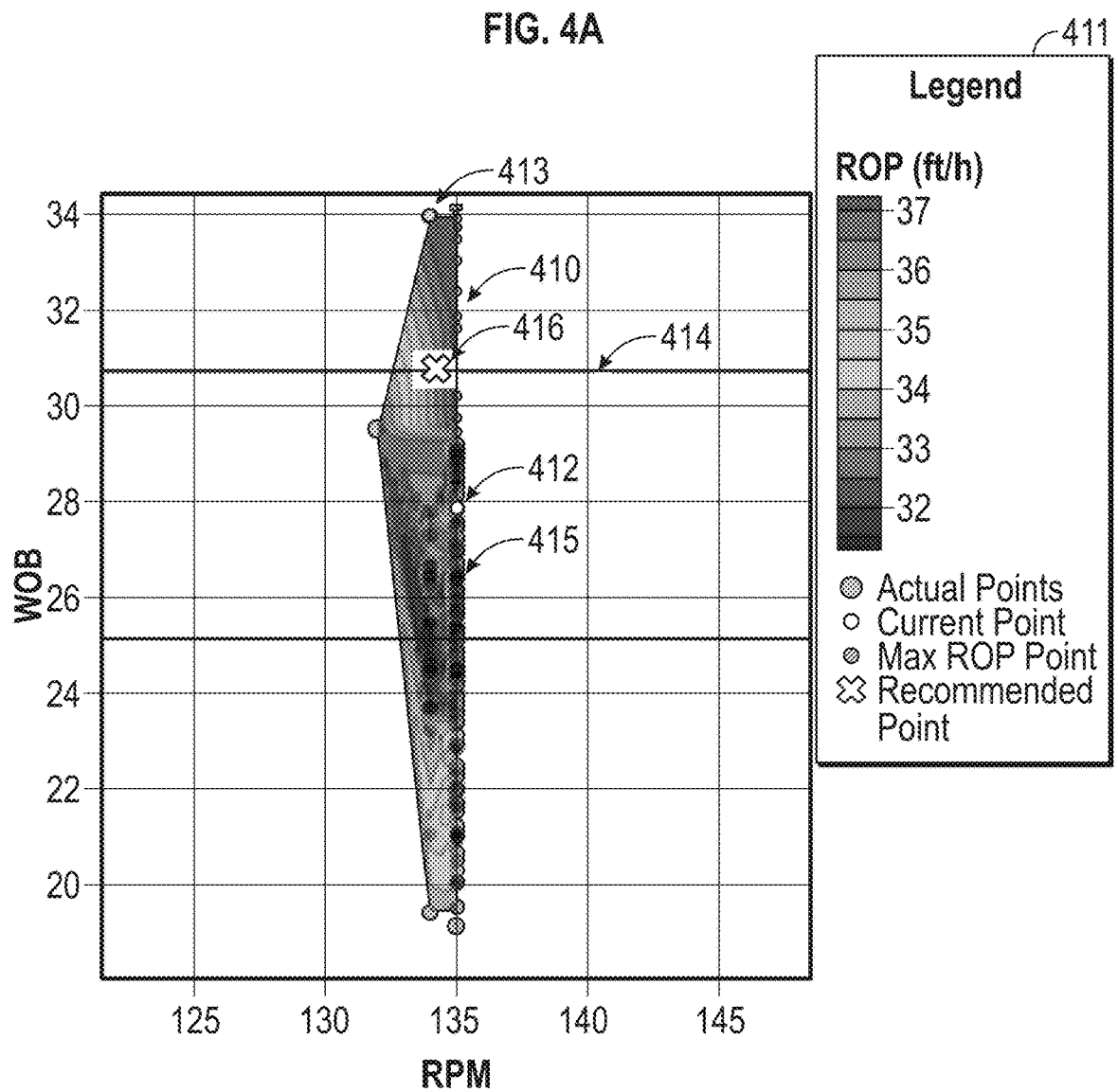

FIG. 4B shows an example heatmap (410) that is constructed where RPM and WOB points are plotted against X axis and Y axis, respectively. The ROP corresponds to the third dimension (i.e., Z axis by viewing from top) and is represented using color or shading/pattern according to the legend (411). Initially, the heatmap (410) includes discrete drilling parameter (i.e., RPM, WOB, ROP, . . . etc.) values (represented as actual points (415)) that are selected by the driller to perform the adaptive DOT procedure. To improve ease of visualization, the heatmap (410) may be filled in with interpolated points in between the discrete values and superimposed with the current point (412), the maximum point (413), and the recommendation rectangle (414). The recommendation window (400) and the heatmap (410) collectively form a drilling dashboard that is displayed to the driller in performing the adaptive DOT procedure and subsequent drilling operation.

Figure 4C:
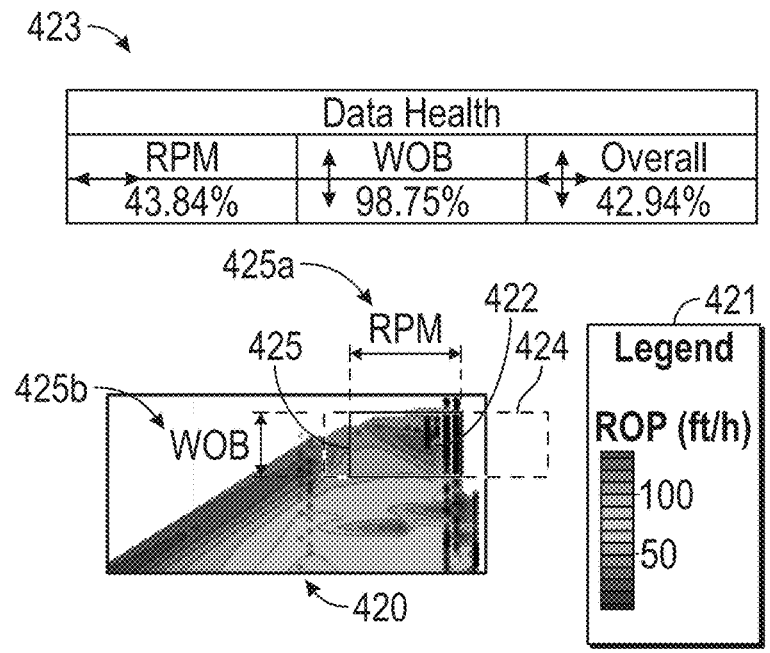

FIG. 4C shows an example heatmap (420) according to the legend (421). The heatmap (420) is associated with a current point (422), a recommendation rectangle (424), and a data health table (423). The data health index is a measure to inform the driller whether the selected RPM and WOB values for the adaptive DOT procedure are well spread and have enough variation to confirm the maximum point. The data health index is calculated as follows based on all drilling data records within the recommendation rectangle (424).

$$\text{Data Health} = \frac{\text{Area(Data within Rectangle)}}{\text{Area(Rectangle)}}$$
$$= \frac{(RPM_{Max} - RPM_{Min}) \times (WOB_{Max} - WOB_{Min})}{(0.2 \times RPM_{Current}) \times (0.2 \times WOB_{Current})}$$

where $RPM \text{ Health} = \frac{RPM_{Max} - RPM_{Min}}{0.2 \times RPM_{Current}}$ and $WOB \text{ Health} = \frac{WOB_{Max} - WOB_{Min}}{0.2 \times WOB_{Current}}$ In the equations above, $RPM_{max}$ and $RPM_{min}$ are the maximum and minimum RPM values selected by the driller during the adaptive DOT procedure. Similarly, $WOB_{max}$ and $WOB_{min}$ are the maximum and minimum WOB values selected by the driller during the adaptive DOT procedure. Area(Data within Rectangle) corresponds to the rectangular area (425) defined by the width (425a)=$RPM_{max}$-$RPM_{min}$ and height (425b)=$WOB_{max}$-$WOB_{min}$. The width and height of the recommendation rectangle (422) correspond to M 0.2×$RPM_{current}$ and 0.2×$WOB_{current}$, respectively. The data health table (423) indicates that the RPM Health=43.84% and the WOB Health=98.75%, resulting in the overall data health index of 42.94%.

Figure 4D:
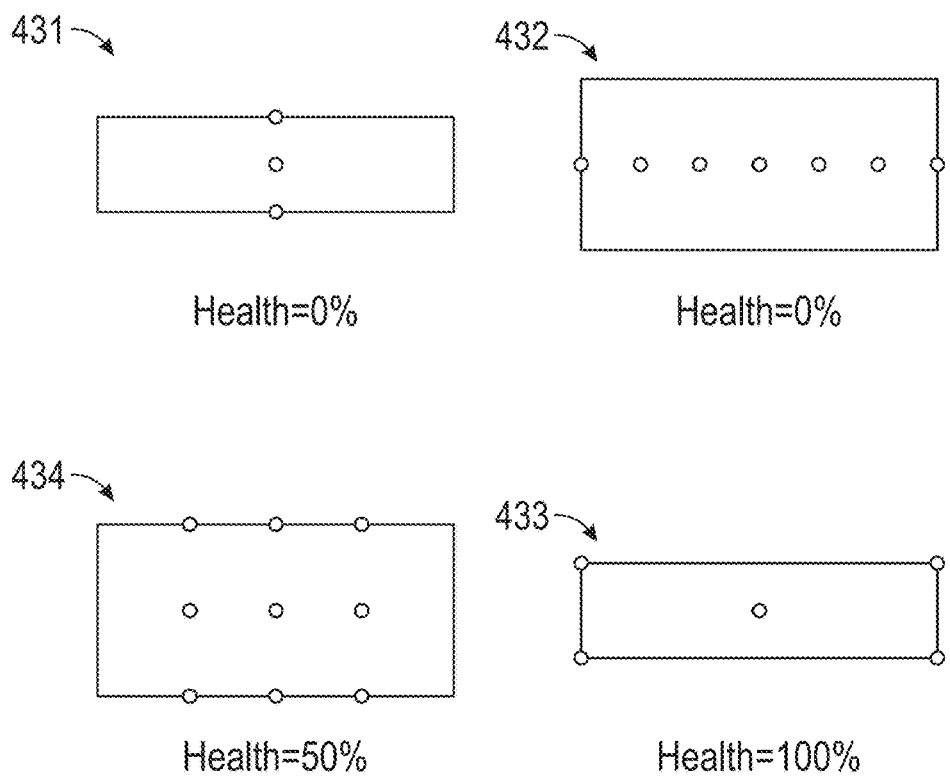

FIG. 4D shows example recommendation rectangles and drilling parameter values with corresponding data health values. As shown in FIG. 4D, the recommendation rectangle (431) and four drilling parameter points with a fixed RPM value has a data health index of 0%. Similarly, the recommendation rectangle (432) and four drilling parameter points with a fixed WOB value also has a data health index of 0%. On the other hand, the recommendation rectangle (433) with four drilling parameter points at the corners of the recommendation rectangle has a data health index of 100%. In addition, the recommendation rectangle (434) with drilling parameter points spreading across a 75% RPM range and the full WOB range of the recommendation rectangle has a data health index of 75%.

Figure 4E:
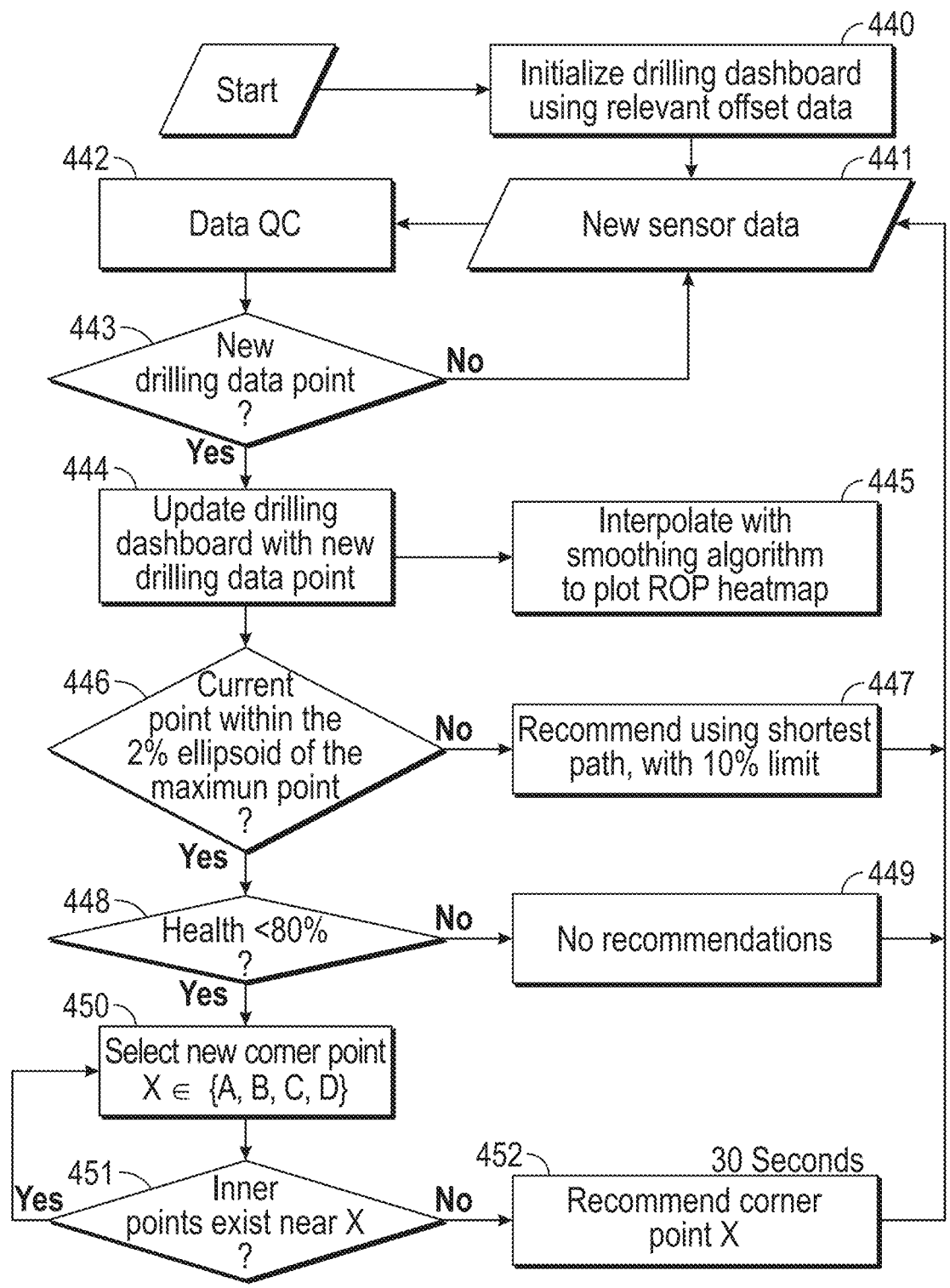

An example of adaptive DOT procedure is described in reference to FIG. 4E below. Before starting drilling operation, in Block 440, the system initializes the drilling dashboard (e.g., heatmap (410) and monitoring dashboard (400)) using drilling data (e.g., ROP, WOB, RPM log) of nearby offset wells (referred to offset data records as initial drilling data records) to display opening heatmap and initial recommendations. If there are multiple offset wells, the offset data records at a particular depth are ordered based on respective ROP value recorded at each offset well at the particular depth. Then, the offset data record with 85th percentile is selected for generating the opening heatmap. This is repeated for each depth to complete the opening heatmap.

When new sensor data (e.g., drilling parameter value) at a new real-time point (e.g., in a new moving time window) is received from surface sensors (Block 441), the sensor data passes through data quality control (QC) filters (Block 442). Data QC includes filtering out non-complete records (e.g., missing RPM or any other key parameter) and removing non-sensible parameters such as negative RPM or ROP exceeding 1000 ft/hr). In Block 443, once the sensor data point passes through data QC, the time-stamped sensor data is used as a new drilling data point if the sensor data includes (i) an added depth compared to previous drilling data record no more than 10 feet and (ii) RPM>0, WOB>0, ROP>0, and FLWPMPS>0. A sensor data record with more than 10 ft of increased depth in one second is considered an outlier according to the condition (i). In addition to data QC, the sensor data record is classified according to the condition (ii) as drilling based on gained footage (i.e., current depth— previous depth>0) and positive drilling speed, pipe rotation, some weight applied, and mud circulation. Otherwise the new sensor data is considered non-drilling and not used.

The new drilling data point is added to the drilling data records as the updated drilling data record for the new moving one-hour window. (Block 444).

Figure 4F:
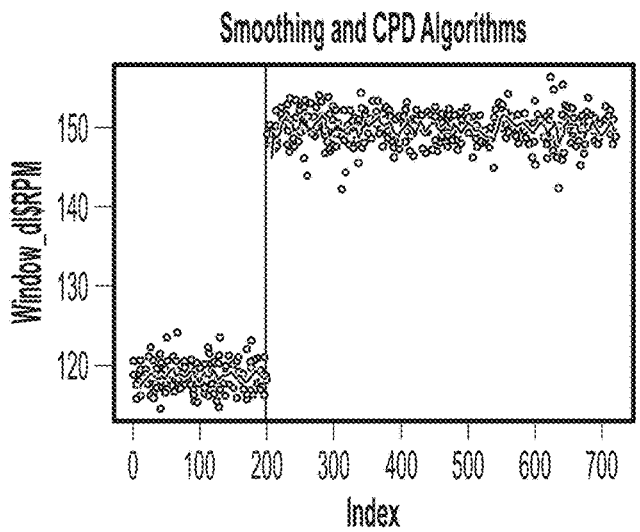
Figure 4G:
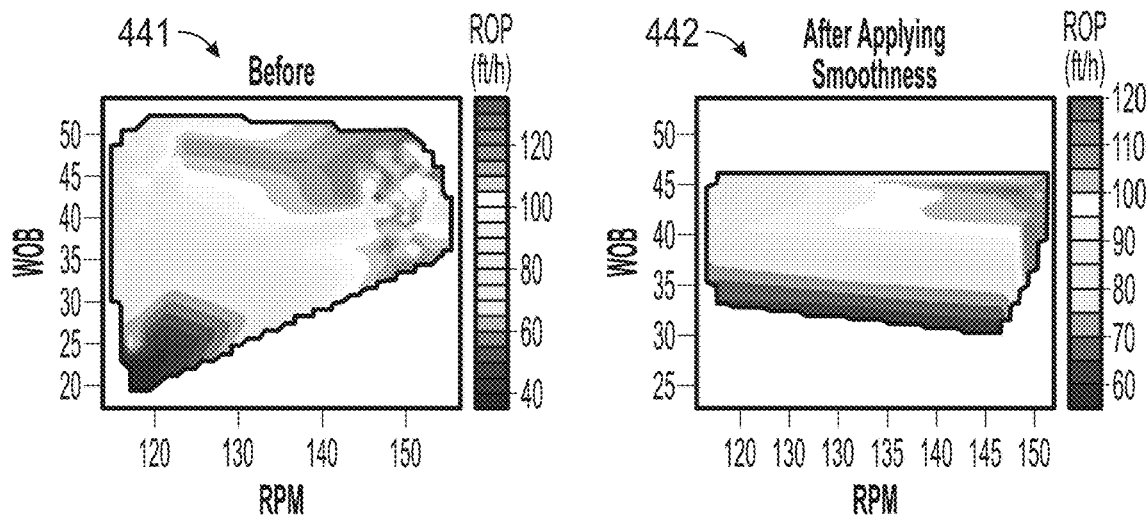

In Block 445, a smoothing algorithm is applied to average out noise to have reliable and realistic interpolations and smoother heatmap, especially with high frequency erratic behavior. In case of the occurrence of data jumps, a Change Point Detection (CPD) is applied to enhance smoothness further before the ROP heatmap is plotted. An example of the smoothing and CPD algorithms are shown in FIG. 4F where the X-axis corresponds to depth or drilling time and the Y-axis corresponds to RPM. FIG. 4G shows the heatmap (441) before applying the smoothing and CPD algorithms and the heatmap (442) after applying the smoothing and CPD algorithms.

In Block 446, a determination is made as to whether the current point (451) is within the 2% ellipsoid (452) of the maximum point (453).

Figure 4H:
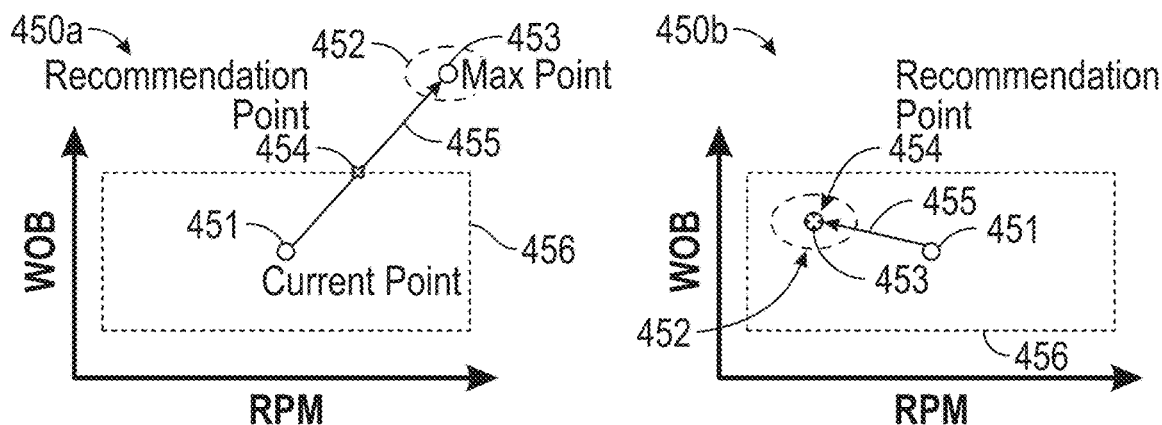

In Block 447, as shown in FIG. 4H, if the current point (451) is not within the 2% ellipsoid (452) of the maximum point (453), the recommended point (454) is selected based on the shortest path line (455) between the current point (451) and the maximum point (453). The 2% ellipsoid (452) is the ellipsoid with maximum point (453) at the center, 2% of maximum point RPM value as the horizontal diameter, and 2% of maximum point WOB value as the vertical diameter. The 2% ellipsoid (452) allows for tolerances where the driller may not be able to achieve the exact drilling parameters of the maximum point (453). The plot (450a) shows the case where the maximum point (453) is on or outside of the recommendation rectangle (456). In the plot (450a), the recommended point (454) is the intersection between the shortest path line (455) and the recommendation rectangle (456). The plot (450b) shows the case where the maximum point (453) is within the recommendation rectangle (456). In the plot (450b), the recommended point (454) is the maximum point (435).

Figure 4I:
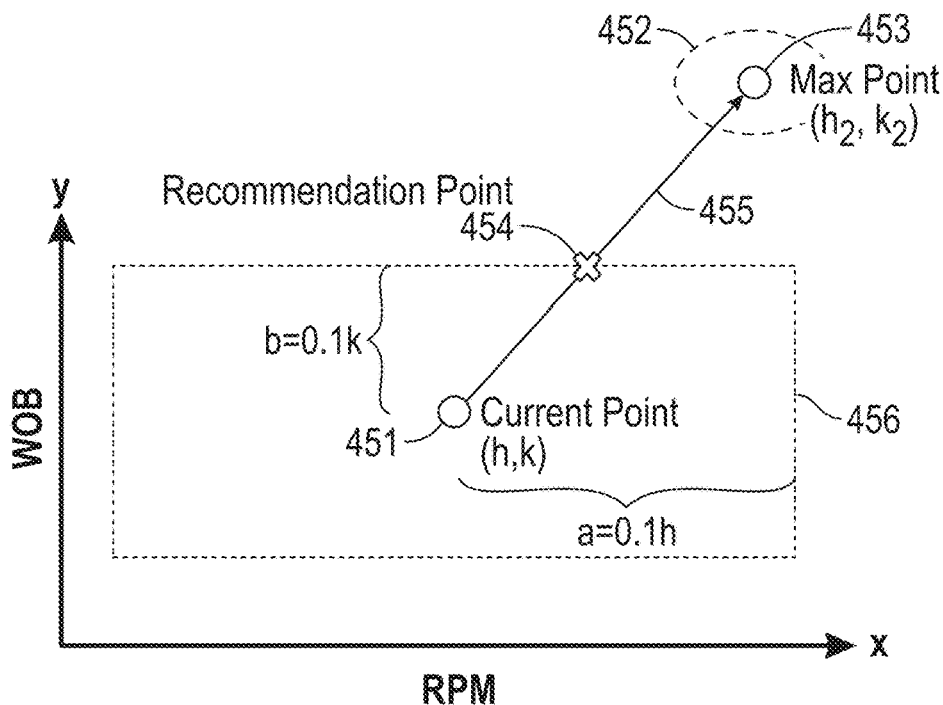

FIG. 4I shows the calculation of the recommendation point (454) for the case in the plot (450a). The shortest path line (455) is represented as Eq. (1), the recommendation rectangle (456) is represented as Eq. (2).

$$\text{Line equation: } y = m(x - h), \quad \text{Eq. (1)}$$
$$\text{where slope } m = \frac{k_2 - k}{h_2 - h}$$

$$\text{Rectangle equation: } \left|\frac{x-h}{a} + \frac{y-k}{b}\right| + \left|\frac{x-h}{a} - \frac{y-k}{b}\right| = 2 \quad \text{Eq. (2)}$$

There are three possible scenarios to calculate the recommendation point (454) by solving Eq. (1) and Eq. (2).

In the first scenario, the shortest path line (455) is horizontal (i.e., m=0): the recommended point is $y_*=k$ and $x_*=h\pm a$ where is the value that minimizes the distance $d=\sqrt{(h_2-x_*)^2+(k_2-y_*)^2}$ In the second scenario, the shortest path line (455) is vertical (i.e., m=±∞): the recommended point is $x_*=h$ and $y_*=k\pm b$ where y, is the value that minimizes the distance $d=\sqrt{(h_2-x_*)^2+(k_2-y_*)^2}$ In the third scenario, the shortest path line (455) is diagonal (i.e., m #±∞ and m #0): the recommended point is $$x_* = h \pm \frac{2}{\left|\frac{1}{a} + \frac{m}{b}\right| + \left|\frac{1}{a} - \frac{m}{b}\right|} \text{ and}$$

$$y_* = k \pm \frac{2m}{\left|\frac{1}{a} + \frac{m}{b}\right| + \left|\frac{1}{a} - \frac{m}{b}\right|}$$

where $x_*$ and $y_*$ are the values that minimizes the distance $d=\sqrt{(h_2-x_*)^2+(k_2-y_*)^2}$.

Figure 4J:
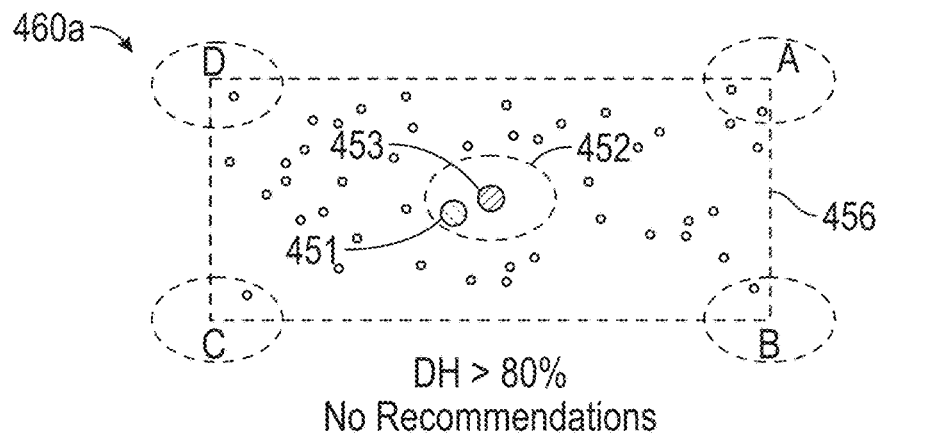
Figure 4J:
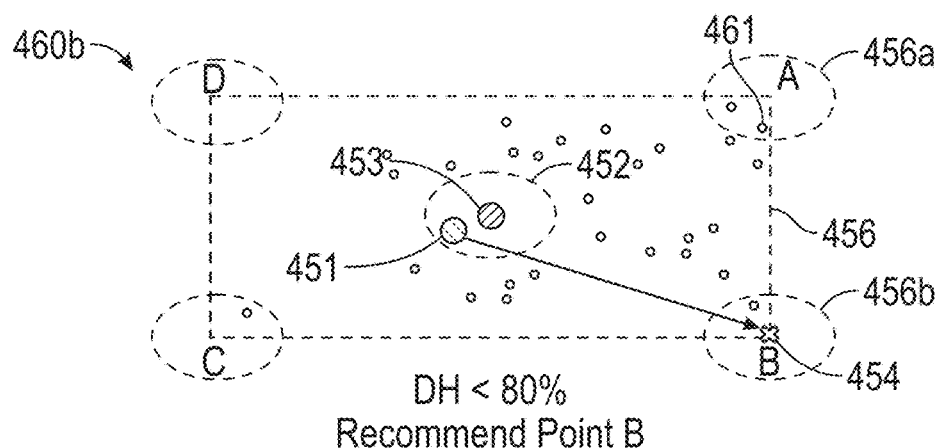

If the current point is within the 2% ellipsoid of the maximum point (Block 446) and the data health index is 80% or higher (Block 448), no recommendations are generated since the primary objective of the adaptive DOT procedure is already achieved (Block 449). FIG. 4J illustrates this scenario as the plot (460a). In FIG. 4J, the open circles correspond to the actual points (415) depicted in FIG. 4B and are used to calculate the data health indictor.

If the current point is within the 2% ellipsoid of the maximum point (Block 446) and the data health index is lower than 80% (Block 448), the objective of the adaptive DOT procedure changes to maximize data health while maximizing the ROP near corner points (A, B, C, D) of the recommendation rectangle (Block 450). FIG. 4J illustrates this scenario as the plot (460b). The corner point A is recommended if none of the actual points (415) (depicted as the open circles) fall within the 2% ellipsoid (456a) of the corner point A, otherwise the next corner point is checked and the process is repeated (Block 451). As shown in the plot (460b), at least one actual point (461) falls within the 2% ellipsoid (456a) of the corner point A, therefore the corner point B is selected as the recommendation point (454) because no actual points fall within the 2% ellipsoid (456b) of the corner point B. It can be mathematically proven that at least one corner point will be recommended if the data health index is below 80%. Once driller moves away from the maximum point ellipsoid (452) towards the recommended point, the adaptive DOT procedure is halted for about 30 seconds before resume again (Block 452).

Figure 4K:
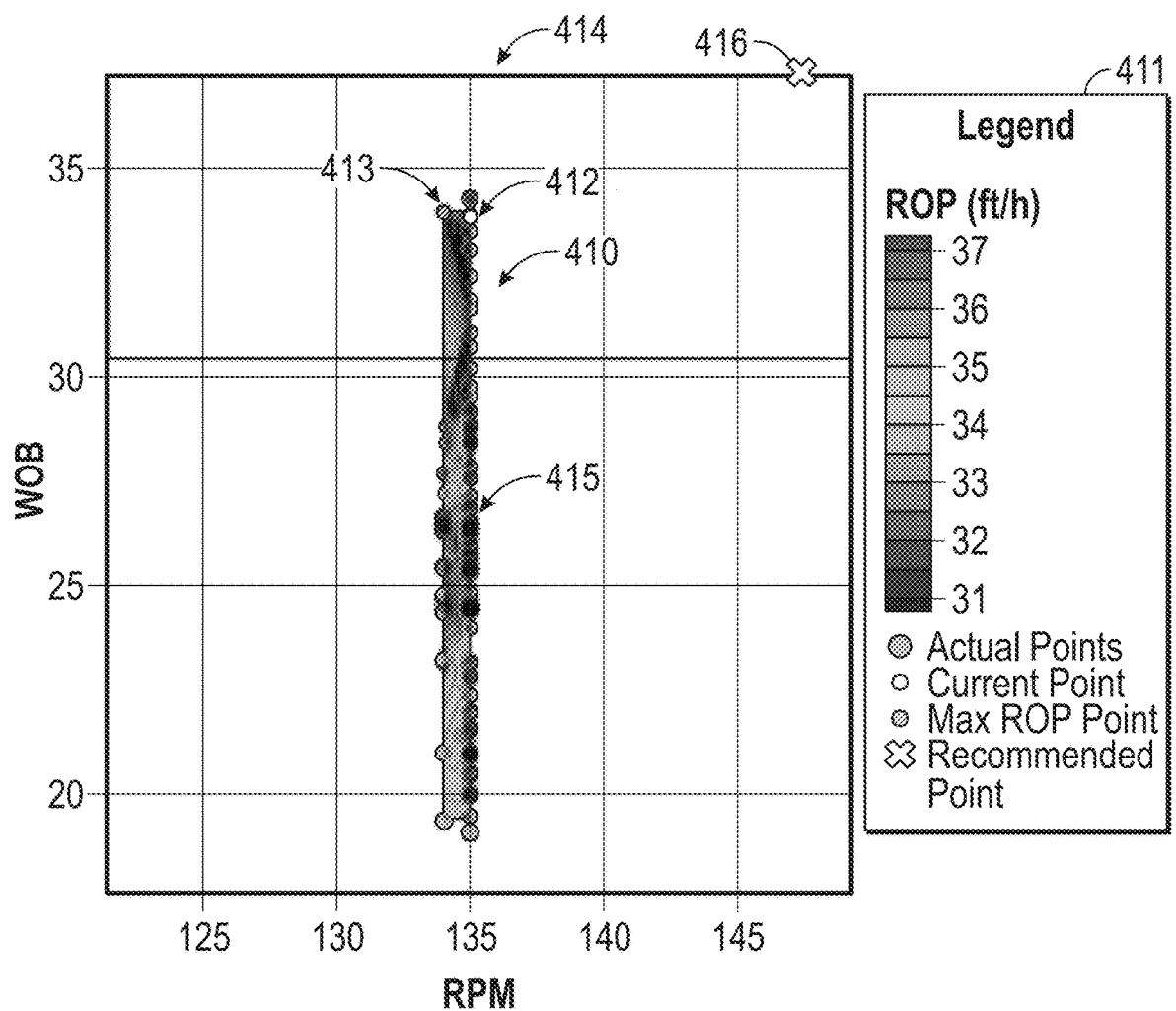

As described above, the adaptive DOT procedure either recommends towards maximum ROP or towards the direction that maximizes data health until the current point reaches the vicinity of the maximum point with the data health index reaches 80% or higher. The scenario where the adaptive DOT procedure recommends towards maximum ROP is illustrated in FIG. 4B above. In the scenario illustrated in FIG. 4B, the actual points include sufficient distributions such that the data health index exceeds 80%. FIG. 4K shows a variation of FIG. 4B where the actual points distribution has a limited RPM range such that the data health index is less than 80%. FIG. 4K illustrates the scenario where the adaptive DOT procedure recommends towards the direction that maximizes data health until the current point reaches the vicinity of the maximum point with the data health index reaches 80% or higher. In particular, the recommendation point (416) guides the driller to increase the RPM beyond the limited RPM range of the actual points (415) to improve the data health index.

Figure 5A:
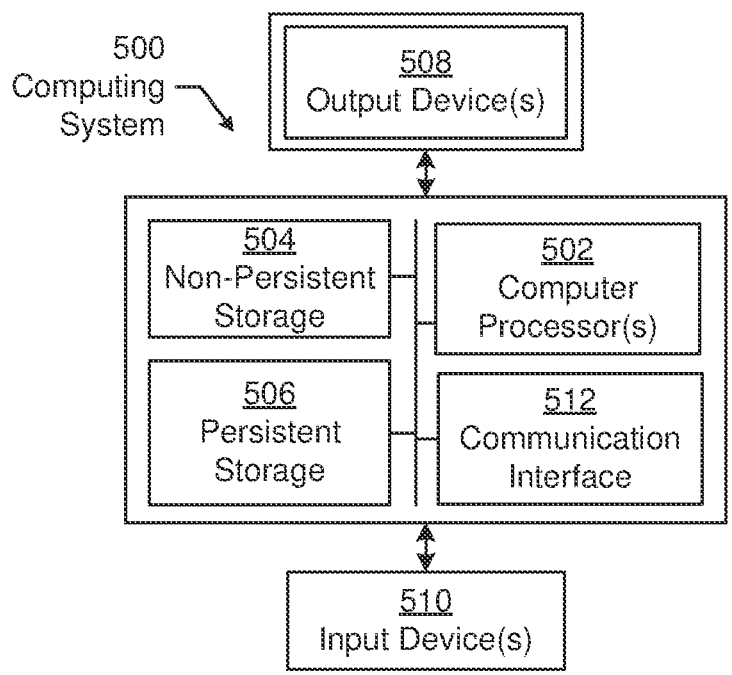
FIGS. 5A-5B show a computing system in accordance with one or more embodiments of the invention.

Embodiments may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 5B:
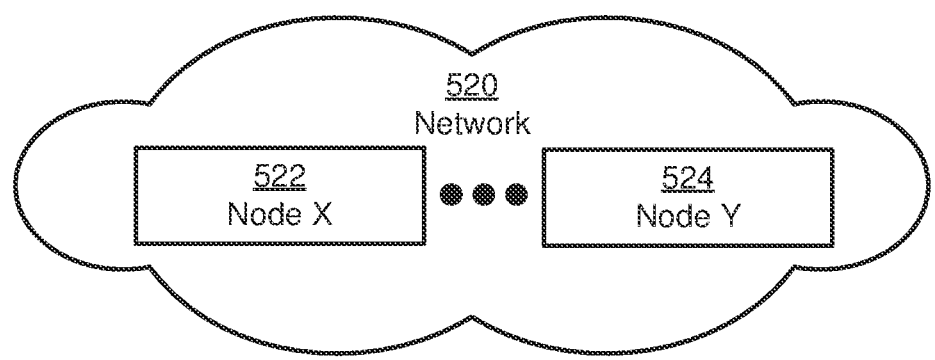

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method for performing a drilling operation of a well in a subterranean formation, comprising:

obtaining a plurality of drilling data records each comprising a revolutions per minute (RPM) value, a weight on bit parameter (WOB) value, and a rate of penetration (ROP) value;

analyzing, using a computer processor, the plurality of drilling data records to generate a maximum point comprising a maximum ROP value that is based on a predetermined percentile of an ROP distribution of the plurality of drilling data records;

generating, during a Drill-Off-Test of the drilling operation, a recommendation rectangle that centers at a current point defined by a current RPM value and a current WOB value of the drilling operation, wherein the recommendation rectangle has an area proportional to values of the current point and comprises:

a recommendation rectangle RPM range corresponding to a predetermined fraction of the current RPM value of the current point; and a recommendation rectangle WOB range corresponding to the predetermined fraction of the current WOB value of the current point;

calculating a fraction of the recommendation rectangle that is occupied by the plurality of drilling data records, wherein the fraction is calculated based on a ratio of a value range across the plurality of drilling data records over a value range of the recommendation rectangle, wherein the fraction represents a measure of sufficiency for a variation of the plurality of drilling data records to select one of two different objectives that increase either the fraction or the ROP value, wherein the recommendation rectangle and the fraction are iteratively updated based on the two different objectives, generating, based on the maximum point and the current point, a recommendation point at a first time point, when the fraction of the recommendation rectangle occupied by the plurality of drilling data records is less than a pre-determined threshold, to direct the drilling operation from the current point towards a direction that increases the fraction;

performing, by a user based at least on a recommended RPM value and a recommended WOB value of the recommendation point, the drilling operation to generate an updated drilling record comprising an updated ROP value at a second time point with an updated current point as defined by an updated current RPM value and an updated current WOB value at the second time point;

updating the plurality of drilling data records to include the updated drilling record;

analyzing the updated plurality of drilling data records to generate an updated maximum point comprising an updated maximum ROP value;

updating the recommendation rectangle to center at the updated current point with an updated area proportional to values of the updated current point;

calculating an updated fraction of the updated recommendation rectangle that is occupied by the updated plurality of drilling data records, further generating, based on the updated maximum point and the updated current point, the recommendation point at the second time point, when the updated fraction of the updated recommendation rectangle occupied by the updated plurality of drilling data records exceeds the pre-determined threshold, to direct the drilling operation from the updated current point towards the updated maximum point that increases the ROP value at the second time point; and presenting, to the user, the further generated recommendation point as a result of the Drill-Off-Test to facilitate the drilling operation.

2. The method of claim 1, further comprising:

performing, during at least one moving time window of a sequence of moving time windows and based on the recommendation point, the drilling operation, wherein the current point corresponds to the drilling operation during a current moving time window prior to the at least one moving time window.

3. The method of claim 1, further comprising:

generating, based at least on an RPM range and a WOB range of the plurality of drilling data records, a data health index that corresponds to the fraction of the recommendation rectangle that is occupied by the plurality of drilling data records, wherein generating the recommendation point is further based on the data health index.

4. The method of claim 3, wherein the recommendation point directs the drilling operation from the current point towards the maximum point to increase the ROP value if the data health index exceeds the predetermined threshold, and wherein the recommendation point directs the drilling operation from the current point towards a corner point of the recommendation rectangle to increase the data health index if the data health index is less than the predetermined threshold.

5. The method of claim 4, wherein generating the data health index is further based on an RPM range ratio of the RPM range over the recommendation rectangle RPM range and a WOB range ratio of the WOB range over the recommendation rectangle WOB range.

6. The method of claim 4, further comprising:

determining a shortest path line between the current point and the maximum point, wherein the data health index exceeds the predetermined threshold and the maximum point is outside of the recommendation rectangle, and wherein the recommendation point corresponds to an intersection between the shortest path line and the recommendation rectangle.

7. The method of claim 4, further comprising:

determining that the maximum point is inside of the recommendation rectangle; and setting the recommendation point equal to the maximum point.

8. The method of claim 1, further comprising:

generating, based on the plurality of drilling data records, an ROP heatmap with respect to the RPM value and the WOB value; and presenting, to the user, the ROP heatmap to further facilitate the drilling operation.

9. The method of claim 1, further comprising:

generating an initial plurality of drilling data records based on historical data of at least one offset well; and generating an initial recommendation point for the drilling operation based on the initial plurality of drilling data records, wherein the initial recommendation point is presented to the user to facilitate the drilling operation during an initial moving time window of the sequence of moving time windows.

10. A computer system for performing a drilling operation of a well in a subterranean formation, comprising:

a processor; and a memory coupled to the processor and storing instructions, the instructions, when executed by the processor, comprising functionality for:

obtaining a plurality of drilling data records each comprising a revolutions per minute (RPM) value, a weight on bit parameter (WOB) value, and a rate of penetration (ROP) value;

analyzing the plurality of drilling data records to generate a maximum point comprising a maximum ROP value that is based on a predetermined percentile of an ROP distribution of the plurality of drilling data records;

generating, during a Drill-Off-Test of the drilling operation, a recommendation rectangle that centers at a current point defined by a current RPM value and a current WOB value of the drilling operation, wherein the recommendation rectangle has an area proportional to values of the current point and comprises:

a recommendation rectangle RPM range corresponding to a predetermined fraction of the current RPM value of the current point; and a recommendation rectangle WOB range corresponding to the predetermined fraction of the current WOB value of the current point;

calculating a fraction of the recommendation rectangle that is occupied by the plurality of drilling data records, wherein the fraction is calculated based on a ratio of a value range across the plurality of drilling data records over a value range of the recommendation rectangle, wherein the fraction represents a measure of sufficiency for a variation of the plurality of drilling data records to select one of two different objectives that increase either the fraction or the ROP value, wherein the recommendation rectangle and the fraction are iteratively updated based on the two different objectives;

generating, based on the maximum point and the current point, a recommendation point at a first time point, when the fraction of the recommendation rectangle occupied by the plurality of drilling data records is less than a pre-determined threshold, to direct the drilling operation from the current point towards a direction that increases the fraction regardless of any change in the ROP value;

performing, by a user based at least on a recommended RPM value and a recommended WOB value of the recommendation point, the drilling operation to generate an updated drilling record comprising an updated ROP value at a second time point with an updated current point as defined by an updated current RPM value and an updated current WOB value at the second time point;

updating the plurality of drilling data records to include the updated drilling record;

analyzing the updated plurality of drilling data records to generate an updated maximum point comprising an updated maximum ROP value;

updating the recommendation rectangle to center at the updated current point with an updated area proportional to values of the updated current point;

calculating an updated fraction of the updated recommendation rectangle that is occupied by the updated plurality of drilling data records, further generating, based on the updated maximum point and the updated current point, the recommendation point at the second time point, when the updated fraction of the updated recommendation rectangle occupied by the updated plurality of drilling data records exceeds the pre-determined threshold, to direct the drilling operation from the updated current point towards the updated maximum point that increases the ROP value at the second time point; and presenting, to the user, the further generated recommendation point as a result of the Drill-Off-Test to facilitate the drilling operation.

11. The system of claim 10, the instructions, when executed by the processor, further comprising functionality for:

performing, during at least one moving time window of a sequence of moving time windows and based on the recommendation point, the drilling operation, wherein the current point corresponds to the drilling operation during a current moving time window prior to the at least one moving time window.

12. The system of claim 10, the instructions, when executed by the processor, further comprising functionality for:

generating, based at least on an RPM range and a WOB range of the plurality of drilling data records, a data health index that corresponds to the fraction of the recommendation rectangle that is occupied by the plurality of drilling data records, wherein generating the recommendation point is further based on the data health index.

13. The system of claim 12, the instructions, wherein the recommendation point directs the drilling operation from the current point towards the maximum point to increase the ROP value if the data health index exceeds the predetermined threshold, and wherein the recommendation point directs the drilling operation from the current point towards a corner point of the recommendation rectangle to increase the data health index if the data health index is less than the predetermined threshold.

14. The system of claim 13, wherein generating the data health index is further based on an RPM range ratio of the RPM range over the recommendation rectangle RPM range and a WOB range ratio of the WOB range over the recommendation rectangle WOB range.

15. The system of claim 13, the instructions, when executed by the processor, further comprising functionality for: determining a shortest path line between the current point and the maximum point, wherein the data health index exceeds the predetermined threshold and the maximum point is outside of the recommendation rectangle, and wherein the recommendation point corresponds to an intersection between the shortest path line and the recommendation rectangle.

16. The system of claim 13, the instructions, when executed by the processor, further comprising functionality for: determining that the maximum point is inside of the recommendation rectangle; and setting the recommendation point equal to the maximum point.

17. The system of claim 10, the instructions, when executed by the processor, further comprising functionality for: generating, based on the plurality of drilling data records, an ROP heatmap with respect to the RPM value and the WOB value; and presenting, to the user, the ROP heatmap to further facilitate the drilling operation.

18. The system of claim 10, the instructions, when executed by the processor, further comprising functionality for: generating an initial plurality of drilling data records based on historical data of at least one offset well; and generating an initial recommendation point for the drilling operation based on the initial plurality of drilling data records, wherein the initial recommendation point is presented to the user to facility the drilling operation during an initial moving time window of the sequence of moving time windows.

* * * * *